Figure 7:
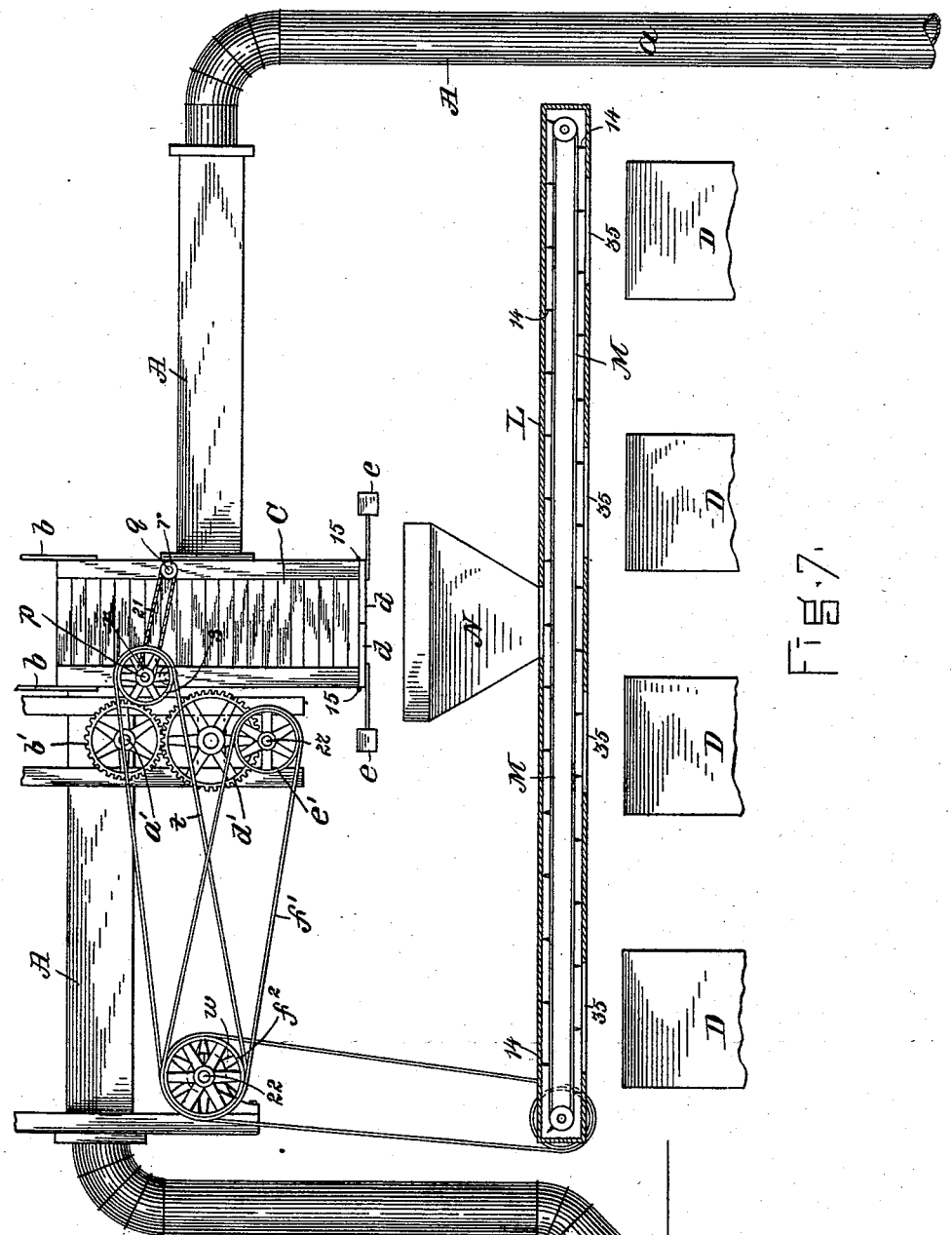

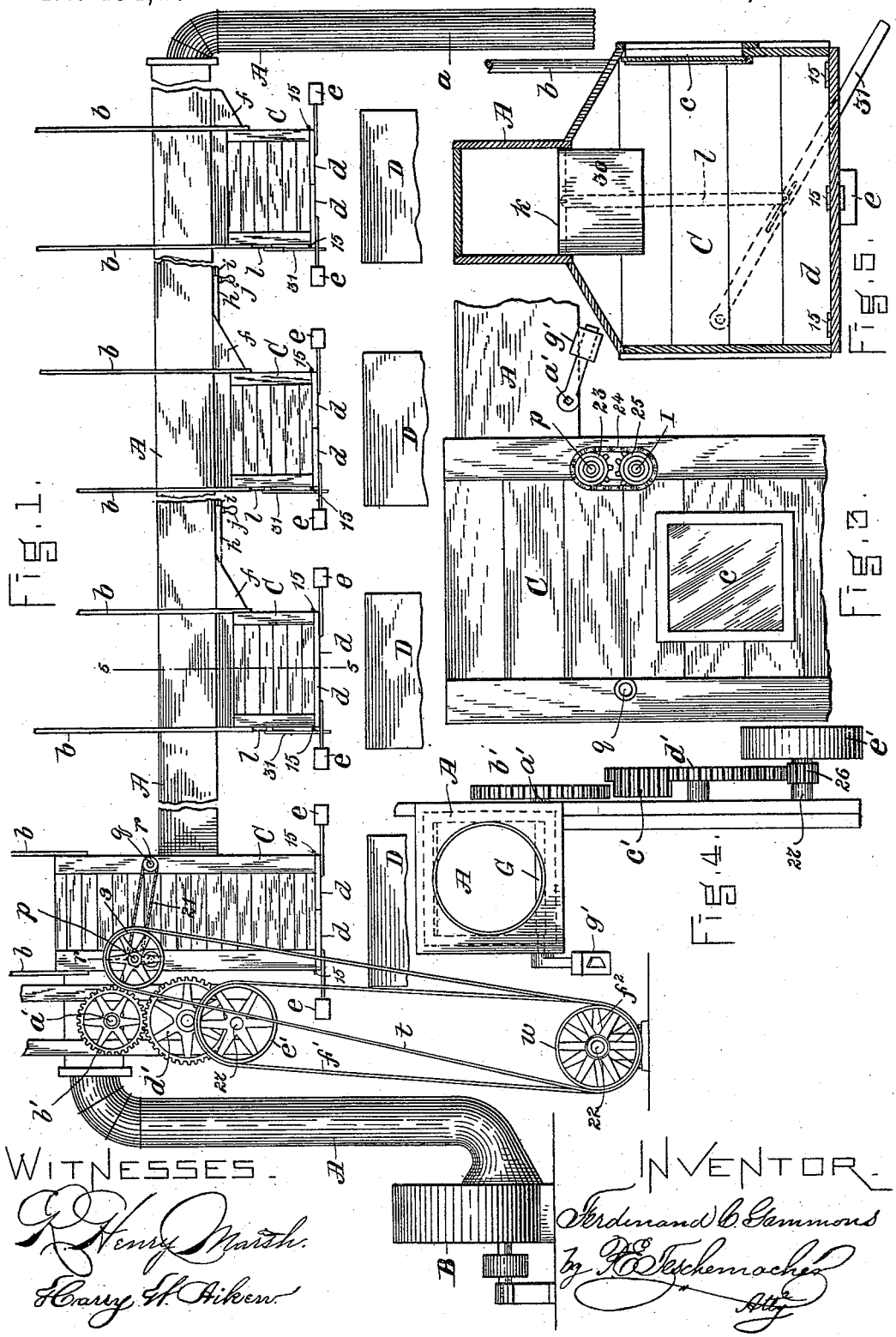

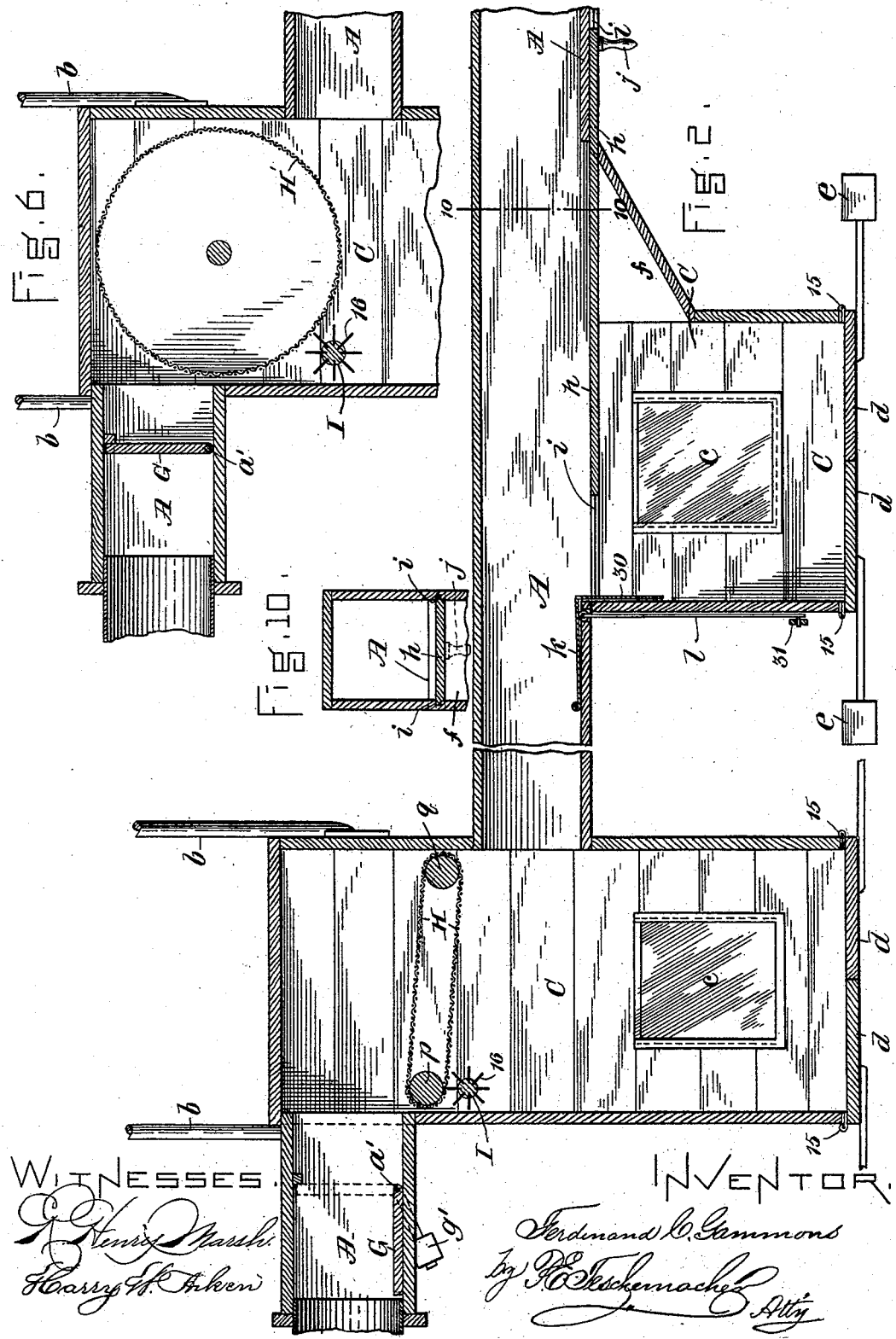

(No Model.) 4 Sheets—Sheet 3.
F. C. GAMMONS.
SEED COTTON CONVEYER.

No. 494,101. Patented Mar. 21, 1893.

WITNESSES. INVENTOR.

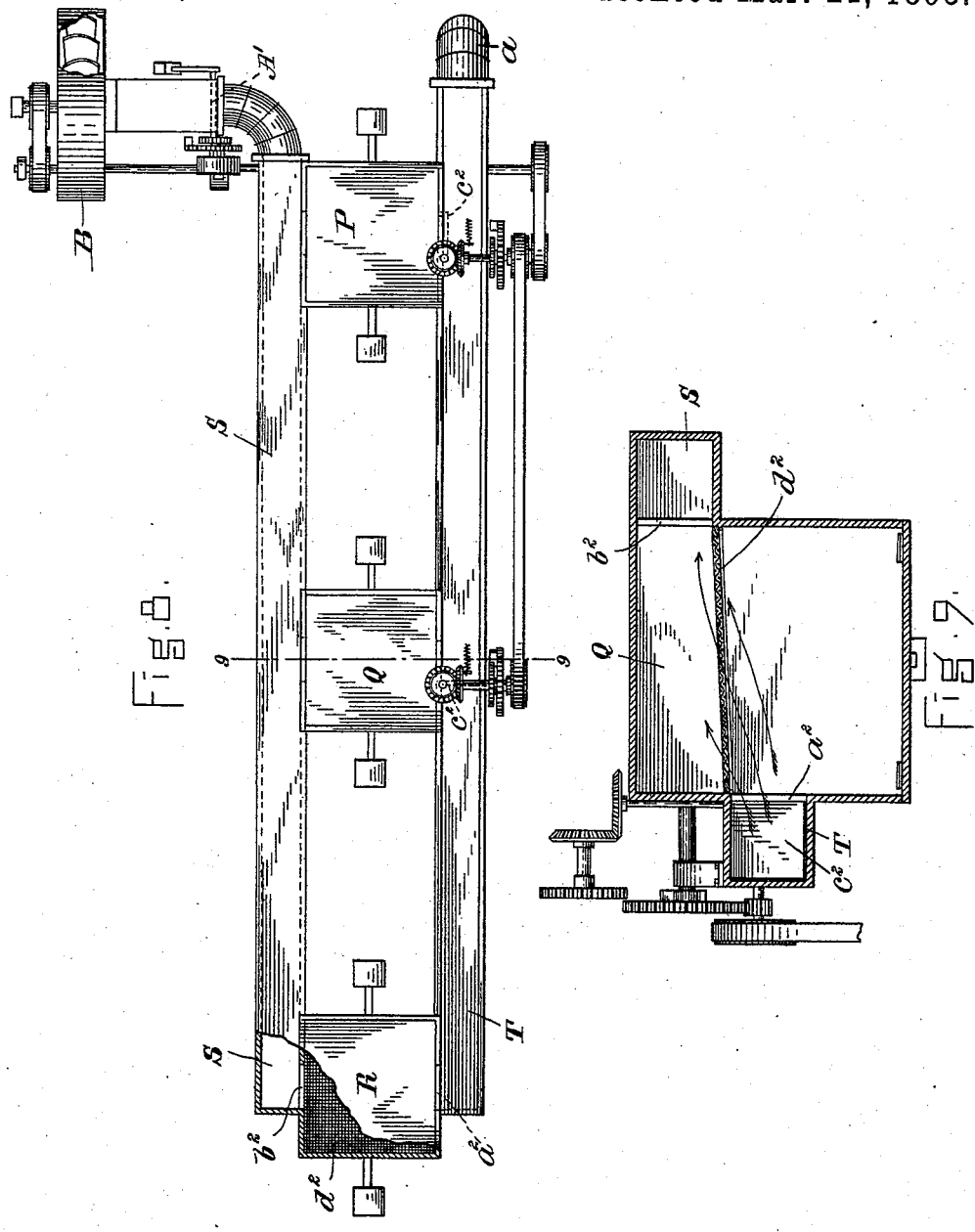

UNITED STATES PATENT OFFICE.

FERDINAND C. GAMMONS, OF BRIDGEWATER, MASSACHUSETTS, ASSIGNOR TO THE EAGLE COTTON GIN COMPANY, OF SAME PLACE.

SEED-COTTON CONVEYER.

SPECIFICATION forming part of Letters Patent No. 494,101, dated March 21, 1893.

Application filed October 1, 1892. Serial No. 447,515. (No model.)

*To all whom it may concern:*

Be it known that I, FERDINAND C. GAMMONS, a citizen of the United States, residing at Bridgewater, in the county of Plymouth and State of Massachusetts, have invented certain new and useful Improvements in Seed-Cotton Conveyers, of which the following is a full, clear, and exact description, reference being had to the accompanying drawings, making part of this specification, in which—

Figure 1 is a side elevation of my improved apparatus for conveying seed-cotton to cotton-gin feeders or other desired location. Fig. 2 is an enlarged longitudinal vertical section through the left hand end of the same. Fig. 3 is a side elevation of the left hand end of the same showing the side opposite to that represented in Fig. 1. Fig. 4 is an end elevation of a portion of the apparatus. Fig. 5 is an enlarged transverse vertical section on the line 5 5 of Fig. 1. Fig. 6 is a detail to be referred to. Fig. 7 is an elevation representing my apparatus arranged in connection with a device for feeding the cotton to cotton-gins having flat feeders. Fig. 8 is a modification to be referred to. Fig. 9 is an enlarged transverse section on the line 9, 9, of Fig. 8. Fig. 10 is a section on the line 10 10 of Fig. 2.

My invention relates to pneumatic apparatus for conveying seed-cotton from a wagon, storehouse, or bin to the cotton-gin feeders or other desired location, and my invention consists in certain novel features and details of construction as hereinafter set forth and specifically claimed.

In the said drawings, A represents a pneumatic tube or conveyer, one end, *a*, of which is adapted to be placed over a wagon, bin, or other place or receptacle from which the cotton is to be drawn by suction and carried forward to the cotton-gin feeders or other desired location, the suction being produced by means of an exhaust-fan or blower B connected with the tube A at a point opposite to that where the cotton is received. Connected with the tube A is a series of cotton receiving boxes C placed over a corresponding number of cotton-gin feeders D. I have here shown four cotton-receiving boxes, but any desired number may be used according to the capacity of the plant and the number of cotton-gins in operation. The boxes C are preferably suspended from the ceiling by means of suitable hangers *b*, which also support the tube A, and each of said boxes is provided on one side with a window or glass-covered aperture *c* through which the interior of the box can be viewed to enable the attendant to watch the progress of the work of filling the boxes. Each of the boxes C is provided with a bottom composed of two leaves or portions *d, d*, hinged to the edges of the box at 15 and counterbalanced by means of weights *e* arranged to keep the bottom closed when aided by the suction produced by the exhaust-fan, but when the suction is interrupted or cut off, the weight of the cotton in the boxes will overbalance the weights *e*, and permit the cotton to fall into the feeders beneath, after which the weights will automatically return the leaves *d* to the position shown in Figs. 1 and 2, and close the bottoms of the boxes as required.

When four receiving boxes C are used, as shown in the drawings, the tube A where it enters each of the first three boxes, is provided on its underside with a downwardly inclined enlargement *f*, the end of the box being cut away to correspond thereto. This enlargement *f* causes the cotton to take a downward course as it enters the box, which results in the latter becoming completely filled before any appreciable quantity of cotton is carried over into the next succeeding box. The tube A is also provided on its bottom adjacent to each of said enlargements *f* with a plate or cover *h* adapted to slide horizontally in suitable guides *i*, and having a handle or projection *j*, Figs. 2 and 10, whereby it can be extended or moved forward to cover any desired portion or the whole of the said enlargement *f*, and in addition thereto any desired portion or the whole of the passage or opening leading from the tube to the box beneath, and thus regulate the quantity of cotton that may be deposited therein by causing more or less of said cotton to pass over into the next succeeding box, for instance, if the slide *h* is drawn entirely back, it will leave the enlargement *f*, as well as the entire entrance to the box, open or uncovered, when it will be filled at the maximum speed, while when the slide *h* is extended more or less across the top of the enlargement *f* or across the top of the box, the latter will be filled more gradually as more cotton will be carried over into the next succeeding box, and by moving the slide *h* into a position to extend entirely across the enlargement and the entrance to the top of the box, all of the cotton will be carried over into the next box, leaving the preceding box covered by the slide, empty; this however, would only be required in case for any reason it should be desired to stop the particular gin and feeder supplied by such box.

At the junction of the tube A with the left hand side of each box C, except the last one, or that nearest the exhaust fan, said tube is provided on the bottom of its interior with a hinged plate *k*, the free end 30 of which is bent downward at a right angle into the box C, fitting snugly against the end of the same as shown in Fig. 2. The plate *k* is provided with a rod *l* extending through the bottom of the tube and provided with a lever 31 or other suitable device whereby said plate *k* may be raised or lowered. The raising of the hinged plate *k* tends to intercept the inflow of cotton at that point and thus retard its passage to the next box more or less, according to the position of the said plate *k*, and in this manner when it is desired to fill any particular box more or less rapidly, the passage of the cotton thereto can be regulated with great nicety by simply adjusting the position of the adjacent plate *k* as above described, using in connection therewith, if desired, the horizontally sliding plate or cover *h*. When the plate *k* is raised, its downwardly bent portion 30 forms a guard to prevent the lodgment of cotton beneath the plate, which would interfere with its proper operation.

The last remaining box C, or that nearest the exhaust-fan, is necessarily provided with a suitable screen arranged to intercept the cotton and prevent it from passing beyond said last box into the exhaust fan, it also being essential to retard as little as possible the free passage of the air in order that the draft or suction may be as effective as possible. The device which I prefer to employ for this purpose consists of an endless traveling apron H composed of wire cloth or other suitable flexible perforated material, and extending across the interior of the last box C as seen in Fig. 2, in such manner as to effectually prevent the passage of any cotton to the exhaust fan B. The apron H is mounted upon and driven by rollers *p*, *q*, journaled in suitable supports and provided with sprocket wheels *r*, over which passes a chain 21, the shaft of one of said rollers carrying a pulley *s* driven by a belt *t* from a pulley *w* on the main driving shaft 22, whereby the apron is caused to travel at the desired speed. Beneath the apron-screen H is placed a rotating clearer or stripper consisting of a roll I, provided with radial strips 16, of leather, rubber, or other suitable flexible material forming wings or blades which are arranged to contact with the traveling apron H and wipe or scrape off any cotton which may adhere thereto, said clearer rotating in a direction opposite to that of the apron H. On the opposite side of the machine the shaft of the roll *p* is provided with a sprocket wheel 23, which is connected by a chain 24 with another sprocket wheel 25 on the end of the shaft of the clearer I, which is thus rotated as required. By this device the cotton that may accumulate on the surface of the apron-screen H is constantly removed and a clean surface continually presented for the free passage of the air, and the force of the draft is thus left undiminished at all times. The traveling apron-screen H may if desired be replaced by a cylindrical screen H' as shown in Fig. 6, and the clearer or stripper arranged in proper relation thereto to remove the cotton that may adhere to its surface, the cylindrical screen being the full equivalent of the endless apron-screen first described; I however prefer the traveling apron-screen, as its shape is more desirable.

Beyond the last receiving box C and between it and the exhaust fan, the pneumatic tube is provided with a cut-off valve G, which is operated as hereinafter described to shut off the suction or draft of air through the tube A. The valve G consists of a plate which is mounted upon a shaft or spindle *a'* and adapted to lie flat on the bottom of the tube when open, and when raised to a vertical position, to completely fill said tube and shut off the air. To one end of the spindle *a'* is secured a gear *b'*, which is periodically engaged by a toothed sector *c'* on a gear *d'*, which meshes with a pinion 26 on a shaft 27, which is provided with a pulley *e'*, driven by a belt *f'* from a pulley on the main driving shaft 22.

The number of teeth on the sector *c'* is such as to rotate the gear *b'* just sufficiently to close the valve G, which takes place when the boxes are filled, thus completely cutting off the suction, when the hinged bottoms *d* of the cotton receiving boxes C will instantly open downward by reason of the weight of the cotton thereon, which will then be discharged into the feeders beneath, said bottoms being again closed automatically by their counterbalance weights *e* as soon as the boxes are emptied. When the toothed sector *c'* has passed out of contact with the gear *b'*, the valve G will be opened by the force of the air assisted by a counter-balance weight *g'* on the end of an arm projecting from its shaft *a'*, as seen in Figs. 2 and 3.

The mechanism for operating the valve G is to be provided with cone pulleys, not shown, or other suitable device to regulate the speed, the valve G being preferably operated once in sixty seconds more or less according to the necessities of the case and the time required to fill the cotton receiving boxes. If desired the valve G can be opened by hand at the will of the operator, but I prefer to set the mechanism so that the opening of the valve by hand will be rendered unnecessary.

The class of feeders represented in the drawings are known as upright feeders having their carrier aprons on an incline, thus taking up only that portion of cotton required and delivering it evenly to the gin. Should the ordinary horizontal feeders be used, only one cotton receiving box need be employed, as shown in Fig. 7, the cotton being carried to the different flat feeders by means of a carrier belt M. Where only one box is used I place a common hopper N directly thereunder into which all the cotton is delivered. This hopper is placed over and above the carrier belt M, the latter having protruding spikes or teeth 14 which take hold of the cotton and carry it through a tubular casing L surrounding said belt to the feeders D. The bottom of this casing L over the rear of the feeders is cut away at points 35, allowing the said feeders to be filled. The cotton then taken by the carrier-apron is carried on to the next feeder and so on, until all the feeders are supplied.

In Fig. 8 is represented a modification of my invention, in which a series of three cotton receiving boxes P, Q, R, are placed over a corresponding number of cotton-gin feeders; any desired number of these boxes, from one upward, may however be employed, according to the requirements of the case. These boxes are provided with hinged counterbalanced bottoms similar to those of the boxes represented in Figs. 1, 2, and 3, and operating automatically in the same manner in connection with a cut-off valve in the pneumatic tube similar to the valve G shown in Fig. 2, said valve being operated by similar automatic mechanism.

Instead of a single pneumatic tube as first described, the boxes P, Q, R, are connected with two pneumatic tubes S, T, leading from the place from which the seed-cotton is to be elevated to the exhaust-fan B, said tubes extending on both sides of the boxes P, Q, R, and communicating therewith through openings $a^2$, $b^2$, on the front and rear sides; the tube S being also provided with a cut-off valve A' adapted to be opened and closed at stated periods by automatic mechanism similar to that employed for operating the cut-off valve G. The front openings $a^2$ of the first two boxes P, Q, are each provided with a hinged gate or cut-off $c^2$ so arranged that when rotated a quarter of a circle by hand or by suitable automatic mechanism into the position shown in Fig. 9, it will open the passage $a^2$, into the box and close the portion of the pipe T between it and the next succeeding box, and when this box is filled, its gate $c^2$ is turned into the position shown dotted at the right hand end of Fig. 8, to close the aperture $a^2$, after which the gate $c^2$ of the next box is moved, as shown in Fig. 9, to close the pipe T beyond, when the second box will be filled, and so on, the gates $c^2$ being provided with weights or springs by which they are closed as soon as released by their opening mechanism.

It is necessary to provide each of the boxes with a screen to intercept the cotton and prevent it from being carried into the fan. I therefore arrange in each box a screen $d^2$, composed of wire or other suitable perforated material, as shown in Figs. 8 and 9, the edge of the screen being placed just above the opening $a^2$, where the cotton enters the box, and being inclined upward to the bottom of the opening $b^2$ on the rear side of the same. By this arrangement the air draft will be in a direction nearly lengthwise of the screen instead of vertically therethrough, thus relieving the screen from liability to become clogged, as the air current will tend to blow the cotton off the screen instead of holding it up against its surface. When all the receiving boxes are properly filled, the cut-off valve A' is closed either by hand or automatic mechanism connected therewith, when the bottoms of all of the receiving boxes will be automatically opened by the weight of the cotton therein, which will then be discharged into the feeders as required, the bottoms of the boxes being then returned to their normal position by their counterbalance weights.

What I claim as my invention, and desire to secure by Letters Patent, is—

1. In a seed cotton conveyer, the combination, with a series of cotton receiving boxes C, and the pneumatic tube or conveyer A arranged above the level of said boxes and having its bottom provided at its junction with said boxes with downwardly inclined enlargements $f$, of the horizontally sliding plates or covers $h$ located on the bottom of said tube A at its junction with the boxes C, and adapted to be extended more or less over or across the tops of the enlargements $f$ and boxes C to regulate the quantity of cotton deposited in said boxes, substantially as set forth.

2. In a seed-cotton conveyer, the combination, with the cotton-receiving boxes, of the pneumatic tube or conveyer having its bottom provided, at its junction with one end of a receiving box, with a horizontally-sliding plate or cover $h$ adapted to be extended more or less over or across the top of said box, and at its junction with the opposite end of said box with a hinged plate $k$ having its free end bent downward to fit within said box, and adapted to be raised within the pneumatic tube to retard the passage of the cotton therethrough, and means for operating the plates $h$ and $k$, substantially as set forth.

3. In a seed cotton conveyer, the combination, with the cotton receiving boxes, of the pneumatic tube or conveyer having its bottom provided, at its junction with one end of a receiving box, with a horizontally-sliding plate or cover $h$ adapted to be extended more or less over or across the top of said box, and at its junction with the opposite end of said box with a hinged plate $k$ having its free end bent downward to fit within said box, and adapted to be raised within the pneumatic tube to retard the passage of the cotton therethrough, means for operating the plates $h$ and $k$, the exhaust fan, the traveling screen, and the rotating stripper or clearer adjacent to said screen, all operating substantially as and for the purpose set forth.

4. In a seed cotton conveyer, the combination of the cotton receiving boxes provided with hinged and counterbalanced bottoms, substantially as described, the pneumatic tube or conveyer having its bottom provided, at its junction with one end of a receiving box, with a horizontally-sliding plate or cover $h$ adapted to be extended more or less over or across the top of said box, and at its junction with the opposite end of said box with a hinged plate $k$ having its free end bent downward to fit within said box, and adapted to be raised within the pneumatic tube to retard the passage of the cotton therethrough, means for operating the plates $h$ and $k$, the traveling apron H, the stripper-roll or clearer I, the cut-off valve G, and mechanism for automatically operating said valve at stated periods, substantially as set forth.

5. In a seed-cotton conveyer, the combination, with a series of cotton-receiving boxes provided with hinged counterbalanced bottoms, of the pneumatic tubes or conveyers S, T, arranged along the sides of said boxes and provided with openings $a^2$, $b^2$, communicating therewith, the openings $a^2$ being provided with hinged gates or cut-offs $c^2$, controlling said openings $a^2$, and each adapted when moved a quarter circle to close the portion of the tube T between said cut-off $c^2$ and the receiving-box next beyond, and the screens for excluding the cotton from the tube S, substantially as described.

Witness my hand this 9th day of September, A. D. 1892.

FERDINAND C. GAMMONS.

In presence of—
  P. E. TESCHEMACHER,
  HARRY W. AIKEN.